Figure 1:
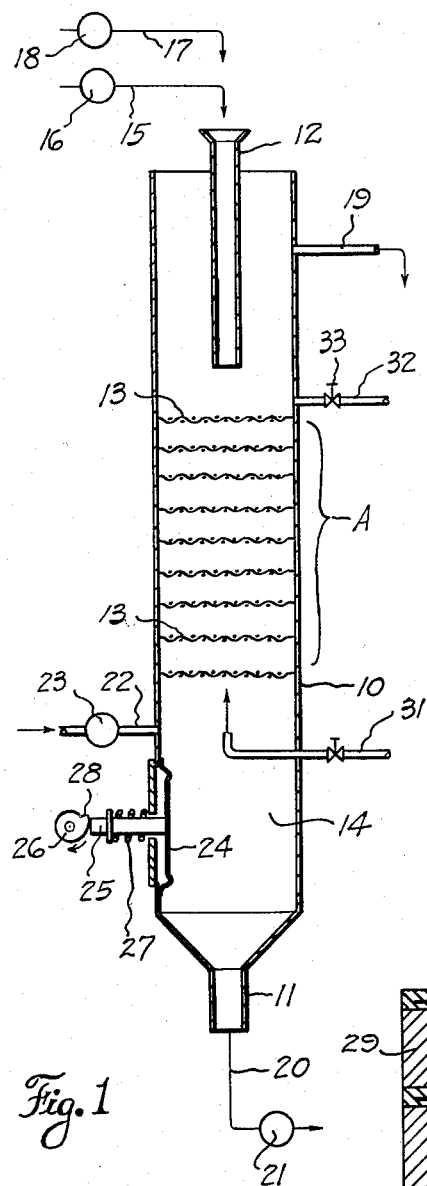

United States Patent Office 2,958,655
Patented Nov. 1, 1960

2,958,655
PROCESS AND APPARATUS FOR SEPARATING FINELY DIVIDED SOLIDS
Hart Brown, 5300 Brownway Road, Houston 19, Tex.
Filed July 12, 1957, Ser. No. 671,539
15 Claims. (Cl. 210—19)

This invention relates to new and useful improvements in processes and apparatus for separating finely divided solids from liquids.

In the processing industry the separation of a liquid, usually containing dissolved constituents, from finely divided solids, which are ordinarily insoluble, presents a considerable problem. The two general methods now in use are filtration and gravity separation by sedimentation or centrifuging, but where simple separation by either method is carried out, complete separation of the liquid or solvent from the finely divided solids is not effected so that a portion of said solvent remains in the interstitial spaces between the particles. Upon subsequent removal of the liquid by evaporation, the constituents previously in solution are admixed with the solids, with the result that if the dissolved constituents are the desirable values, some of them are lost and if the insoluble solids are the desirable values, they are contaminated with the remaining unwanted constituents. For this reason, it is the general practice to wash the solid residue from filtration or from gravity separation to effect as complete as possible a separation of the desirable from the undesirable values.

However, filtration processes have their limitations in that complete and efficient separation involving extremely fine particles is difficult if not impossible. In the case of gravity separation, it is general practice to employ a series of thickeners, but most thickener operations involve at least an hour average retention time to assure that the underflow will be as dense as practical and this means a relatively long overall elapsed time to accomplish the desired result. Furthermore, thickeners occupy considerable floor space and represent a costly investment.

It is, therefore, one object of this invention to provide an improved process and apparatus for efficiently separating finely divided solids from a liquid medium, which process may be carried out in a single compact unit in a minimum length of time.

An important object is to provide an improved process and apparatus for separating finely divided solids from a liquid medium wherein the mixture is introduced into a vessel and a flocculating agent is added to enhance the flocculation of the solids, after which the flocced solids and liquids are subjected to alternate periods of turbulence and quiet in a series of stages and at the same time a counter-current flow of wash liquid upwardly through the settling solids is maintained, whereby an excellent separation of the solids and liquid is accomplished by settling and washing actions.

A particular object is to provide a process and apparatus, of the character described wherein the feed is subjected to a combined settling and washing action in a series of closely spaced superposed compartments or stages with the area of each compartment or stage being relatively small in vertical elevation, whereby rapid settling of at least a portion of the solids in each stage occurs, after which the settled material is moved downwardly into the next stage; the overall result being that maximum efficient separation is accomplished in a minimum length of time.

Another object is to provide an apparatus, of the character described, having a vessel in which a plurality of superposed settling compartments or stages are formed by spaced screen elements, together with means for forming the solids into flocs of a size which will not pass through the screen elements by gravity but which will settle on the upper surface of said screen elements; the apparatus also including means for imparting a sudden relative movement to the screens and solids with respect to each other at desired intervals to physically force the flocced solids downwardly through said screens and to at the same time subject the contents of each compartment to turbulence and agitation, whereby subsequent settling of the solids in each compartment or stage is enhanced.

A further object is to provide a method and apparatus which will effectively separate finely divided solids from a liquid medium even though such solids may be so fine that separation by usual filter methods is difficult or impossible.

Another object is to provide a method and apparatus which is effective in separating a liquid medium having constituents in solution therewith from finely divided insoluble solids, the same being particularly applicable for recovering salts of uranium which are in aqueous solution, from finely divided solids, such as slimes or other finely divided insoluble fractions which were present in the uranium ore when it was introduced into the preceding leaching apparatus.

A particular object is to provide an improved apparatus, of the character described, which accomplishes a washing action equivalent to a counter-current decantation operation in a minimum length of time and which is simple and compact in construction and economical in original cost and operation, as compared to the usual series of bulky thickeners or a large tray thickener.

The construction designed to carry out the invention will be hereinafter described, together with other features thereof.

Figure 2:
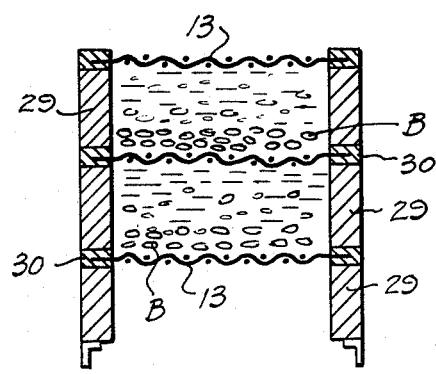

The invention will be more readily understood from a reading of the following specification and by reference to the accompanying drawings forming a part thereof, wherein an example of the invention is shown, and wherein:

Figure 1 is a vertical sectional view diagrammatically illustrating an apparatus constructed in accordance with the invention, Figure 2 is an enlarged sectional view illustrating the manner in which the particles settle upon each screen, and Figure 3 is a view similar to Figure 1 of a modified form of the invention.

In the drawing (Figure 1) the numeral 10 designates a vertical vessel or tower which is illustrated as having an open upper end and a conical lower end, the latter being provided with a discharge line 11. An inlet conductor 12 is located in the upper portion of the vessel and the central portion of the vessel generally indicated at A comprises a compartment or stage section. This section is formed by a plurality of transversely extending screen elements 13 which are located in spaced relationship, one above the other, throughout the section A. Below the screens 13, the interior of the vessel is substantially free of any obstructions and forms a settling chamber 14.

The feed slurry or mixture, which may be a liquid medium having finely divided solids admixed therewith, is introduced through an inlet line 15 having a metering pump 16 connected therein. The particular feed is dependent upon the material to be recovered, but for purposes of explanation, may consist of a liquid comprising an aqueous solution having desirable values dissolved therein and admixed with finely divided solids which it is desired to separate. The slurry is introduced through the inlet 15 and passes downwardly through the inlet conductor 12 so as to discharge upon the uppermost screen 13 of the central section of the vessel. If desired, a suitable oscillating or rotating rake (not shown) may be mounted above this uppermost screen to distribute the feed evenly over the entire screen area.

To encourage settling of the finely divided solids which are in suspension in the feed mixture, a suitable flocculating agent, such as the Dow Chemical Company's "Separan" is introduced through an inlet 17 having a suitable metering pump 18 connected therein. The "Separan" will cause the finely divided solids to flocculate and form flocs of sufficient size to cause fairly rapid settling of at least a portion of the solids upon the surface of the uppermost screen. As will be hereinafter described, the areas between the screens form compartments or stages and the flocculated solids will be progressively moved downwardly through the compartments of the section A, while the liquid will rise within the vessel to be discharged through a liquid outlet overflow pipe 19. If the liquid medium has desirable values dissolved therein, such values will, of course, be recovered with the liquid. The solids, which have been caused to settle and move downwardly through the screens 13 and through the successive compartments, will be discharged from the vessel through the discharge line 11, which has connection with a discharge conductor 20. Said discharge conductor may have a suitable metering pump 21 connected therein.

To produce an upflow of liquid within the vessel and to thoroughly wash the downwardly settling solids, a washing liquid is introduced through an inlet 22 by means of a metering pump 23; the wash liquid enters the vessel at a controlled rate at an elevation below the lowermost screen 13 and passes upwardly at a relatively slow rate through the various screens and is discharged along with the liquid, which has been separated, through the outlet pipe 19.

The outlet line 19 may have a suitable discharge control valve or other mechanism (not shown) which controls the rate of discharge of the liquid through said line. The discharge conductor 20 also has its rate of discharge controlled and since the inlet 15 for the feed slurry, the inlet 17 for the flocculating agent and the inlet 22 for the wash liquid all are provided with flow rate controls in the form of metering pumps, it is evident that proper adjustment of these various controls for the in and out flows will produce the proper relative rates of flow through the vessel. Thus, the upward flow of liquid within the tower and the rate of discharge of the settling solids may be adjusted to suit the particular constituents and conditions.

In order to impart a periodic surge to the liquid column within the vessel, a flexible diaphragm 24 is mounted in the lower portion of the vessel. This diaphragm may be operated by means of an actuating rod 25 which is maintained in contact with the periphery of a rotatable operating cam 26 by a coiled spring 27. The cam is rotated at a desired r.p.m. by any suitable prime mover (not shown). A single lobe or projection 28 is formed on cam 26 and as the cam rotates in a clockwise direction in Figure 1, the diaphragm 24 is moved gradually inwardly of the vessel to impart a slow upward movement to the liquid column within said vessel. When the actuating rod suddenly falls off of the cam lobe or projection, the spring moves the diaphragm outwardly of the vessel with an abrupt or rapid motion. This results in a sudden downward movement of the liquid column within the vessel with respect to the various superposed screens 13 and this action functions to pull the flocced particles, which have settled on the upper surface of each screen, downwardly through the interstices or openings of the screens. Therefore, the solids, which have settled on upper surfaces of the screens during the period when the column was moved upwardly at a relatively slow speed, are suddenly jerked downwardly through the screens and a turbulent action or agitation occurs in each space or area between the screens. Although only a single diaphragm 24 has been illustrated, it is obvious that additional diaphragms could be provided to effect the desired displacement.

The cam arrangement may be varied from that illustrated to move the liquid column upwardly at a fairly rapid rate after which the column would be completely quiescent until the sudden or abrupt downward motion of the column. Also, other means, such as an air pump mechanism, could be employed to operate the diaphragm for imparting the required motion to the liquid column.

The practice of the method and the operation of the apparatus, will be described in connection with the separation of a liquid having soluble mineral salts dissolved therein from finely divided clay solids, ordinarily referred to as slimes. In such case the wash liquid introduced through inlet 22 is water. The feed slurry having salts in solution and having finely divided insoluble solids in suspension, is introduced into the inlet conductor 12 through line 15 and simultaneously therewith a flocculating agent is introduced into the feed stream; as illustrated in Figure 1, the flocculating agent may flow directly from the inlet pipe 17 into the conductor 12 but it could be introduced into the line 15, in which case it would admix with the feed stream. The flocculating agent causes the finely divided solids to flocculate and form flocs of sufficient size to effect a settling of the same and said flocculating agent is introduced in sufficient quantity to effect fairly rapid or prompt settling of at least a portion of the solids. The size of the interstices or openings of the screens is such that the major portion of the flocs so formed will not readily pass, merely by settling action, through the screen 13 and thus said flocs will settle upon the upper surface of the screen in the form of a layer or blanket, accumulating on the surface in the manner generally indicated at B in Figure 2.

At the same time a controlled volume of wash water is introduced through pipe 22 so that there is a relatively slow upflow of liquid through the vessel. As explained, the actuating cam 26 is rotating at a slow speed so that the diaphragm 24 is moving slowly inwardly of the vessel to displace additional liquid in an upward direction. The timing period of the cam is such that by the time said cam has made one revolution to locate the lobe 28 opposite the actuator rod 25 of the diaphragm, there has been a settling of the flocculated solids on the upper surface of each screen within the areas between the screens which form the compartments or stages of the central section A.

At this time the condition within each area or compartment formed between the screens is somewhat as shown in Figure 2. The majority of the flocs B have settled or accumulated upon the upper surface of the screen in a layer and above the settled flocs is liquid with some unsettled or lighter particles. When the rod 25 falls off of the cam lobe 28, there is a sudden outward displacement of diaphragm 24 which results in a sudden downward movement of the liquid column within the vessel. The force created by the sudden downward movement of the liquid column with respect to the screens 13 forces the flocculated solids on the upper surface of each screen to pass downwardly through the screen and into the next stage or compartment therebelow. Any flocs, which are too large to normally pass the screen openings, will actually be forced through the openings by being broken up and, obviously, the sudden downward movement of the column will also create a turbulence in each compartment area between adjacent screens 13. This turbulence will result in an agitation and stirring action which will enhance contact between the solids and the flocculating agent as well as contact between the solids with each other; at the same time, it will encourage any soluble particles, which may have remained in an undissolved state to enter into solution with the liquid.

The action of the diaphragm is continued at regular predetermined intervals and the overall effect is that the flocculated solids are moved progressively downwardly from one screen into the area or compartment therebelow, then through the next screen and so on until, having passed the lowermost screen 13, the solids will settle downwardly and be discharged through the discharge conductor 20.

The upflow of wash water through the vessel moves the wash water progressively upwardly through the successive compartment areas between the screens and in so doing thoroughly washes the solids which are settling in counter-current flow thereto. This washing action effects a substantially complete separation of the soluble particles from the insoluble solids and washes the liquid solvent from said solids. That portion of the wash water, which ultimately passes upwardly through the section A, is discharged from the vessel along with the liquid solvent through the overflow pipe. It is noted that the wash water may be introduced continuously at a controlled rate throughout each cycle or it may be introduced throughout some portion of said cycle.

The arrangement provides a plurality of settling compartments or stages which are relatively small in vertical elevation. This means that the time required for settling of the layer of flocculated solids onto each screen is relatively short because the distance to be travelled by the settling solids between the screens is minimized. The time cycle or interval between surges is such that as soon as a layer of solids settles onto the screen, said layer is moved, by reason of the surge, into the next below compartment. At the same time, the material in each compartment is agitated and then a quiescent period follows to repeat the settling operation in the next stage. In actual practice, all of the solids in any one compartment do not settle onto the screen, as diagrammatically illustrated in Figure 2, and, therefore, it is not necessary to provide a long enough time cycle for all solids in each compartment to settle. This reduces the overall separation time which is of decided advantage.

The particular size of the openings in the screens and the vertical dimensions of the compartment as determined by the spacing between the screens is subject to variation in accordance with the particular material being treated, the drawing being merely schematic as to such spacing. As an example, in the separation of salts of uranium which are in aqueous solution from finely divided insolubles, it has been found that the spacing between the screens can be in the order of one inch, which provides compartment dimensions of approximately one inch in height. For this spacing, a sudden downward excursion of the fluids, as effected by the diaphragm, can be in the order of one-fourth to one-third of an inch. Of course, the number of screens and their spacing is subject to considerable variation, but so long as series of superposed stages of relatively small vertical dimension are provided, the improved results will be obtained.

As to the size of the interstices or openings in the screens 13, it is desirable that the size be such that the flocs formed will not readily pass therethrough by a mere settling action; however, the openings must not be so small that the sudden downward excursion of fluids will not force the floc through the openings. Actual practice has shown that screen openings of from 0.20 mm. to 0.80 mm. have produced satisfactory results. Although all compartments may be of the same size, the apparatus will operate even though the spacing between screens varies.

It may be desirable to support each screen by means of a supporting grid (not shown), which grid can be formed by interconnected cross bars. As illustrated in Figure 2, a spacing and supporting frame 29 may be interposed between the frame 30 of each screen 13 and said frame 29 may have the supporting grid (not shown) attached thereto so as to give the screen the desired support.

The amount of flocculating agent, which is introduced, is properly controlled for if an excessive amount of such agent is admitted, the solid materials tend to collect in the form of a thick blanket upon the upper surface of the uppermost screen which can effectively stop the downward flow of fluids through the vessel; further, the excessive accumulation of solids on the upper surface of the screens would encourage channeling through limited paths at a relatively high vertical velocity, thereby defeating the overall purpose. If too little flocculating agent is introduced, the extremely fine particles tend to remain in suspension in each compartment and will not pass through the vessel at a sufficiently high rate to obtain commercial results. The metering pump 18 may be utilized to control the introduction of the flocculating agent and in addition it might be desirable to provide additional points of entry for the fluocculating agent, which points of entry would be spaced at different elevations within the section A of the vessel.

Since experience has shown that inefficient operation can result because of improper proportioning of the flocculating agent, it might be desirable to provide some kind of a detecting means which will indicate an excessive thickness of particles settling upon the surface of the uppermost screen 13. For example, a sight glass (not shown) could be provided in one wall of the vessel opposite the uppermost screen so that the operator may view the screen and visually determine when an excessive rise in the level of the solids on the screen takes place; in such instance, the volume of flocculating agent being introduced may be adjusted. Also, an automatically operated regulating device may be employed to control introduction of said agent. In lieu of a sight glass, some type of automatic signalling means can be provided, such as a photo-electric cell arrangement or a float; either of such devices could be utilized to actuate a signal when an excessive rise in the solids on the uppermost screen occurs.

In certain instances, either because of incorrect proportions of the flocculating agent, or for other reasons, the screens may become clogged by an undue quantity of solids accumulating upon their upper surfaces. In order to readily clean the apparatus, an air inlet pipe 31 is provided for directing air upwardly through the screen section. Also an emergency discharge line 32, having a suitable valve therein, is located immediately above the uppermost screen 13. By introducing the air and by increasing the introduction of water through pipe 22, the screen section of the vessel may be quickly and effectively back washed. In this instance, the material removed from the vessel through either lines 19 or 32 would, of course, be recycled for retreatment.

Although the diaphragm 24 has been found satisfactory for imparting the desired surge or excursion to the fluid within the vessel, the method may be carried out by other types of apparatus and in Figure 3 a modified form of the invention is illustrated. Referring to this figure, an outer vessel 40 is formed with an open top and has a discharge 41 at its lower end. An inner vessel 42 also having its top open to atmosphere and having the spaced screens 13 mounted therein, is suspended from a supporting bar 43, which in turn is carried by a pivoted lever 44. A spring 45 maintains the lever in engagement with the periphery of an operating cam 46 which is similar to the cam 26 of the first form. An inlet pipe 47 is secured in the upper end of the inner vessel and is adapted to receive the feed slurry and the flocculating agent through lines 15 and 17.

The inner vessel has a liquid discharge pipe 48, which pipe is provided with a flexible section 49, whereby relative movement of the inner vessel 42 with respect to the outer vessel 40 is possible. A flexible section 32a is connected in the emergency discharge line 32 which connects with the inner vessel 42 just above the uppermost screen. The wash water inlet pipe 22 extends through the wall of the outer vessel 40.

In the operation of the form shown in Figure 3, the feed slurry and flocculating agent are introduced through the inlet conductor 47 and the flocculated solids fall downwardly onto the screens 13 in the manner as heretofore described. Wash water is introduced under a controlled rate through the line 22 and such water will flow upwardly through the inner vessel 42. By reason of the cam 46 and the operating connection with the inner vessel, the inner vessel gradually moves downwardly so that the screens 13, mounted within said vessel gradually move in a downward direction. The rate of this movement is less than the settling rate of the flocculated solids so that the same settling of solids upon the upper surfaces of the screens occurs. When the lever 44 falls off the cam lobe 46a, the vessel 42 undergoes a sudden upward movement with respect to the liquid column therein. This gives the same effect as the excursion caused by the diaphragm of the first form, forcing the settled flocs downwardly through the interstices of the screen. As heretofore explained, the flocculated particles progress downwardly through each compartment or area between the screens until they pass through the lowermost screen and into the settling chamber 14 from which they are discharged through a discharge line 20a extending from the outer vessel 40. The liquids passing upwardly through the vessel 42 escape through the overflow or liquid discharge line 48.

In both forms of the invention, the finely divided solids are admixed with a flocculating agent which increases their settling rate to the point where the major portion of said solids rapidly accumulate on the upper surfaces of the screens. Then, by a sudden surge, the settled particles are forced through the openings in the screen into the area immediately therebelow, and a turbulence is produced, all of which enhances the separation of the solids from the liquid. It has been found that the separation may occur in a much shorter time than is the case where the feed slurry is placed in a thickener and separation is effected solely by settling rate. The apparatus is relatively simple in construction and provides a compact unitary structure which from an economic standpoint is considerably less in the overall cost than the series of thickeners now in general use.

The capacity of the apparatus is basically that number of pounds (measured dry) of the finely divided solids that pass downward per square foot of screen area per hour. The capacity is a function of the frequency of down strokes of the fluid content, provided sufficient interval is allowed for most of the solids to collect on top of each screen. In actual practice, for certain slimes removed from a uranium acid-leaching circuit, the apparatus passes one ton (equivalent dry weight) solids per three square feet per twenty-four hours. The apparatus has operated successfully at from one cycle per minute to six cycles per minute. Obviously, because the vertical height of each compartment area is small, the pulp density attained by the solids accumulating on each screen in this short period is less than the density which would be attained in one hour's settling time in a thickener stage. However, equivalent washing can be accomplished because the apparatus lends itself to the inclusion of many more stages and in actual practice, an apparatus, constructed in accordance with this invention, has twenty-seven stages or compartment areas in a vessel only six feet in height. The unit provides substantial economic advantages over the usual series of thickeners now in general use.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. The method of separating finely divided solids from a liquid medium which includes, introducing the feed mixture consisting of the liquid medium and the finely divided solids into a vertical column, introducing a flocculating agent into said column to admix with the feed and effect a flocculation of the solids, causing the flocculated solids to move progressively downwardly through a series of shallow compartment areas which are formed by spaced screen elements, said solids being retained in each compartment only for a sufficient length of time to permit a layer of solids to settle upon the screen element defining the lower end of each compartment, and simultaneously flowing a wash liquid upwardly within the column in a counter-current direction to the downwardly moving solids.

2. The method of separating finely divided solids from a liquid medium which includes, introducing the feed mixture consisting of the liquid medium and the finely divided solids into a vertical column, introducing a flocculating agent into said column to admix with the feed and effect a flocculation of the solids, causing the flocculated solids to move progressively downwardly through a series of shallow compartment areas which are formed by spaced screen elements, said solids being retained in each compartment only for a sufficient length of time to permit a layer of solids to settle upon the screen element defining the lower end of each compartment, simultaneously flowing a wash liquid upwardly within the column in a countercurrent direction to the downwardly moving solids, withdrawing the separated solids from the lower portion of the column, and withdrawing the liquid medium as well as some of the wash liquid from the upper portion of the column.

3. The method as set forth in claim 2, wherein the flocculated solids are caused to move downwardly through the compartment areas by imparting a sudden relative movement to the solids and to the liquid column.

4. The method as set forth in claim 2, together with the additional steps of controlling the inflow of the feed mixture and the volume of introduced flocculating agent, controlling the volume of incoming wash liquid, and further controlling the rates of discharge of the liquid and the solids from said column.

5. The method of separating finely divided solids from a liquid medium which includes, introducing the mixture of solids and liquid into the upper portion of a fluid column, introducing a flocculating agent into said column to cause the solids to form flocs which settle downwardly, accumulating the flocculated solids on a perforate surface, flowing wash liquid upwardly within the column at a relatively slow rate while the solids are settling, and then imparting a sudden relative motion to said solids and said fluid column to cause the solids to pass through said perforate surface and move downwardly therebelow, withdrawing the solids from the lower portion of the column, and withdrawing the liquids from the upper portion thereof.

6. The method of separating finely divided solids from a liquid medium which includes, introducing the mixture of solids and liquid into the upper portion of a fluid column, introducing a flocculating agent into said column to cause the solids to form flocs which settle downwardly, accumulating the flocculated solids on a perforate surface, flowing wash liquid upwardly within the column at a relatively slow rate while the solids are settling, and then imparting a sudden relative motion to said solids and said fluid column to cause the solids to pass through said perforate surface and move downwardly therebelow, progressively repeating the steps of accumulating the flocculated solids on a perforate surface and of imparting sudden relative motion to said solids and fluid column at predetermined intervals, withdrawing the solids from the lower portion of the column, and withdrawing the liquids from the upper portion of said column.

7. The method as set forth in claim 5, together with the step of controlling the amount of flocculating agent which is introduced into the column to control the flocculation of the solids.

8. The method as set forth in claim 5, together with the step of controlling the amount of flocculating agent which is introduced into the column to control the flocculation of the solids, and controlling the volume of liquid withdrawn from the upper portion of the tank and the volume of solids withdrawn from the lower portion thereof to control the relative flow rates within and through the column.

9. An apparatus for separating finely divided solids from a liquid medium including, a vertical vessel having a feed mixture inlet in its upper portion, a solids outlet in its lower portion and a liquid outlet in its upper portion, a series of shallow compartment areas within the interior of the vessel between the feed mixture inlet and the solids outlet and formed by a plurality of superposed screen elements, means for introducing a flocculating agent into said vessel to admix with the solids and effect flocculation thereof to a floc size which will not gravitate through the screen, whereby said flocculated solids will settle downwardly through the compartment areas and accumulate upon the upper surfaces of the screen elements, and means for imparting a sudden motion to the solids and liquid column within the vessel in one direction only relative to the screen element to cause the solids which have accumulated on the screen elements to pass downwardly through the screen elements and to at the same time agitate the contents of each compartment area, whereby the solids are progressively settled downwardly through the vessel until reaching the discharge.

10. An apparatus as set forth in claim 9, wherein the sudden motion of the solids and liquid column relative to the screen is effected by a movable means mounted in the side of the vessel which imparts a sudden downward motion to the liquid column.

11. An apparatus as set forth in claim 9, wherein the sudden motion of the solids and the liquid column relative to the screen is effected by imparting a sudden upward motion of all of the screen elements with respect to the liquid column.

12. An apparatus as set forth in claim 9, together with a wash liquid inlet conductor connected in the lower portion of the vessel below said compartment areas, whereby the wash liquid introduced into the vessel flow upwardly through the compartment areas to thoroughly wash the downwardly moving solids.

13. An apparatus as set forth in claim 9, together with a wash liquid inlet conductor connected in the lower portion of the vessel below said compartment areas, whereby the wash liquid introduced into the vessel flows upwardly through the compartment areas to thoroughly wash the downwardly moving solids, means for controlling the volume of wash liquid which is introduced, means for controlling the volume of liquid discharging from the vessel, and means for controlling the amount of solids discharging from the vessel whereby the relative flow rates through the vessel are controlled.

14. An apparatus as set forth in claim 9, wherein the means for imparting sudden relative motion to the solids and liquid column comprises a flexible diaphragm mounted in one side of the lower portion of the vessel, and cam-actuated means for moving the diaphragm inwardly at a relatively slow rate and then suddenly returning the diaphragm to its outer position, whereby a sudden downward motion of the liquid column relative to the screen elements is produced.

15. An apparatus as set forth in claim 9, wherein the means for imparting sudden relative motion to solids and liquid column comprises, an inner vessel movably mounted within the main vessel and having the screen elements attached thereto, and means for periodically imparting a sudden upward movement to said inner vessel with respect to said outer vessel.

References Cited in the file of this patent

UNITED STATES PATENTS

| | | |
|---|---|---|
| 2,635,949 | Fenske et al. | Apr. 21, 1953 |
| 2,742,381 | Weiss et al | Apr. 17, 1956 |